United Stat[es Patent]
Jennings et al.

[11] 3,801,204
[45] Apr. 2, 1974

[54] APPARATUS FOR LINEAR DICHROISM DETERMINATION

[76] Inventors: Barry Randal Jennings, 29 Stewart Ave., Shepperton; Edward Dyson Baily, 10 Henson Close, Cranfield, both of England

[22] Filed: May 19, 1972

[21] Appl. No.: 255,185

[30] Foreign Application Priority Data
May 22, 1971 Great Britain.................... 16510/71
Mar. 2, 1972 Great Britain...................... 9763/72

[52] U.S. Cl.................... 356/117, 356/201, 350/150
[51] Int. Cl. ........................................... G01n 21/40
[58] Field of Search ........... 356/114, 115, 116, 117, 356/118; 350/151, 150, 149

[56] References Cited
FOREIGN PATENTS OR APPLICATIONS
6,611,362  2/1967  Netherlands........................ 356/117

OTHER PUBLICATIONS
An Apparatus for the Measurement of Dichroism in a Pulsed Electric Field; 41 Review of Scientific Instruments, 211, Feb. 1970
Electro–Optic Deflection Device; 6IBM Technical Disclosure Bulletin; 52, May 1964

*Primary Examiner*—Ronald L. Wibert
*Assistant Examiner*—Conrad Clark
*Attorney, Agent, or Firm*—Diller, Brown, Ramik & Wight

[57] ABSTRACT

For ascertaining the linear dichroism of a material when subjected to an electric, magnetic, hydrodynamic or acoustic force field, the invention proposes applying such a field to a sample of the material in a cell coincident with a beam of monochromatic and parallel light of predetermined wavelength and obtaining a signal representing such dichroism (referred to in the specification as "longitudinal dichroism") from a photoelectric cell, photomultiplier or other photodetector, whereby polarisation of the light is made unnecessary. A particular form of sample cell, defined by a series array of a plurality of individual cells or compartments, each having means for applying a said force field, is also disclosed. The apparatus is contemplated not only for laboratory testing but also (using a flow cell) for "on line" applications, for controlling a parameter of a manufacturing plant or other quality control purposes.

7 Claims, 5 Drawing Figures

APPARATUS FOR LINEAR DICHROISM DETERMINATION

This invention relates to apparatus for ascertaining the linear dichroism of a material or substance when subjected to an electric, magnetic, hydrodynamic or accoustic field (hereinafter collectively referred to as a "force field"); it also relates to a method or process of testing, applicable to the improvement or control of manufacture, entailing the ascertainment of linear dichroism in such materials or substances.

Dichroism is the property of a material preferentially to absorb light which is polarised in a particular state. The dichroism involved when plane or linearly polarised light is used is termed "linear dichroism".

Many materials are naturally dichroic for light of a given wavelength. Others have this property induced in them when they are subjected to various forms of external constraint.

Hitherto, linear dichroism produced by an electric field or electric linear dichroism has been measured by recording the changes in the light absorption by a material when the incident light beam is plane polarised and an electric field is applied transverse to the propagation direction of the incident light beam. Measurements have had to be made both (a) with the electric field vector parallel to and (b) with the field vector perpendicular to, the plane of polarisation of the plane polarised, incident light beam. These cases may be referred to as "parallel transverse" and "perpendicular transverse" respectively.

The phenomenon upon which the present invention is based (hereinafter referred to as "longitudinal dichroism") is the fact that, if the force field is applied to the material or substance along the direction of and in the region of (viz. preferably coincident with) the incident light beam, the condition of perpendicular transverse dichroism is obtained whatever the state of polarisation of the incident light beam. Moreover, the absorption of the material or substance in the absence of a force field is, it has now been realised, an averaged combination of the perpendicular and parallel transverse cases. Thus, by the measurement of the absorption of a material or substance prior to and during the application of a force field of suitable intensity, the linear dichroism due to this field - in the case of an electric field, the electric linear dichroism - of the material or substance can be obtained by applying the force field along the direction of, and in the region of (viz. preferably coincident with) the incident light beam, without the need to polarise the beam at all.

Thus, according to a first aspect of the invention, apparatus for ascertaining the linear dichroism of a material or substance when subjected to a force field as hereinbefore defined, comprises, in relative alignment, a source of a beam of monochromatic and parallel light of at least one predetermined wavelength, a photodetector arranged to receive light from the said source through a sample of a said material or substance and responsive to changes in the intensity of the light so received, and between the said source and detector a cell for accommodating a said sample, the said cell being arranged to receive a said beam directly from the source and to transmit it directly to the detector and having means for applying a said force field to the sample parallel with and in the region of the beam.

According to a second aspect of the invention, for use in apparatus according to the said first aspect of the invention, a cell for accommodating a sample of a material or substance is defined by a series array of a plurality of individual cells aligned for the transmission therethrough of a said beam, each said individual cell having means for applying a said force field to the sample parallel with and in the region of the beam and being arranged to permit communication between portions of the sample in adjacent said individual cells.

According to a third aspect of the invention, a method or process for testing a material or substance entailing the ascertainment of linear dichroism therein when subjected to a force field as hereinbefore defined includes irradiating a sample of the said material or substance with a beam of unpolarised monochromatic and parallel light of at least one predetermined wavelength, applying to the sample a said field parallel with and in the region of the beam and detecting any change in the light transmitted by the sample consequent on any change in the strength of the said field.

According to a fourth aspect of the invention, a method or process of manufacturing a material or substance comprises the step of continuously or intermittently testing a sample of the said material or substance by a method or process according to the said third aspect of the invention and controlling a parameter of the said manufacturing method or process in response to any change in the light transmitted by the sample detected, consequent on any change in the strength of the said field.

The invention also includes within its scope any material or substance when manufactured by a method or process of manufacture according to the said fourth aspect of the invention or in plant comprising apparatus according to the said first aspect of the invention.

Preferably the said force field is an electric field, in which case the said means for applying the field to the sample are electrodes.

At least one of the said electrodes may be defined by a coating of a wall of the cell in a plane transverse to the said beam, the said coating being transparent to the said light and electrically conductive.

Alternatively, at least one of the said electrodes may be defined by a grid of electrically conductive material attached to a wall of the cell in a plane transverse to the said beam, which in either case is preferably perpendicular thereto.

Where a said cell is, as aforesaid, defined by a series array of a plurality of individual cells, the walls of the said individual cells in a plane perpendicular to the said beam may be relatively staggered laterally with respect to the axis of the said beam in such a way that the said communication between portions of the sample in adjacent said individual cells occurs along a meandering path.

The apparatus may include means responsive to a signal representing longitudinal dichroism received by the said detector and adapted to control a parameter of a manufacturing plant or for other quality control purposes.

The cell for accommodating the sample may be such as to cause or permit the sample to flow continuously or intermittently in a direction transverse to the axis of the beam.

Apparatus and methods embodying various aspects of the invention as aforesaid will now be described, by way of example only in the context of electric linear dichroism, with reference to the accompanying drawings, in which.

Figure 1:
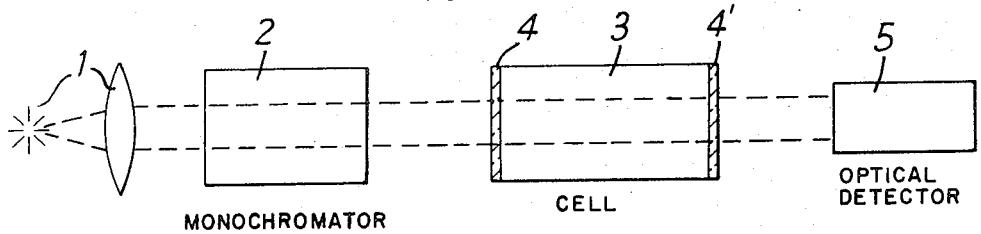
FIG. 1 is a simple diagrammatic representation of the principal components of the apparatus.

Referring to FIG. 1, light from a light source 1, which might conveniently be a lamp and lens assembly, is passed through a monochromator 2 (or an optical filter) which is capable of isolating light of a required wavelength. The monochromator 2 is followed by a cell 3 containing a sample of the material or substance under examination. The essential feature of the cell 3 is that the entrance and exit faces for the light beam must be transparent to the light and yet, in this particular construction, be coated with a conducting material which will act as electrodes 4,4' for the electric field. Such windows are commercially available. Alternatively transparent windows may be used with grid electrodes attached thereto. In that latter case, the light beam would be carefully adjusted so as to pass through a grid interspace. With either of these arrangements, the electric field would be longitudinal to (or along) the light beam.

The light penetrating the apparatus or system then falls on an optical detector 5, such as a photoelectric cell or photomultiplier.

With the arrangement shown, the absorption of the system for light of any preselected wavelength can be determined from the detector output prior to the application of the electric field to the material or substance in the cell 3. The relative change of the detector signal when an electric field, which may be a DC, alternating or pulsating field, is applied can then be related to the dichroism of the sample.

Figure 2:
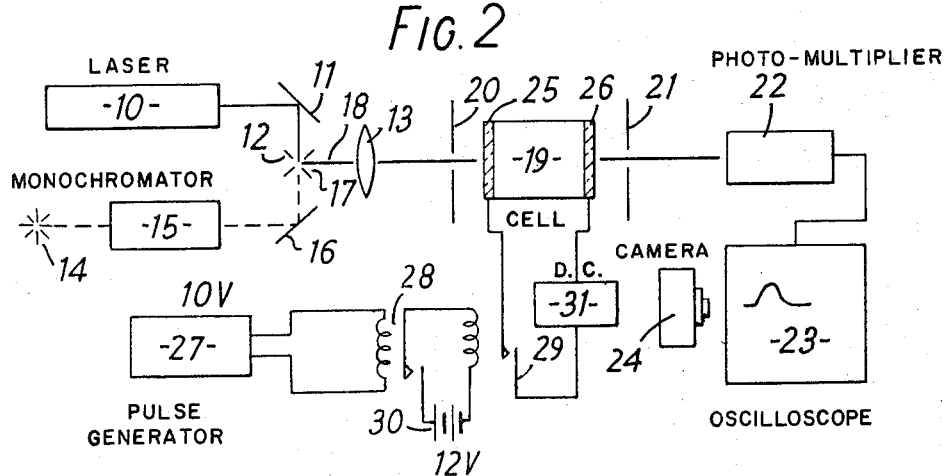
FIG. 2 is a schematic diagram of the complete apparatus.
Figure 3:
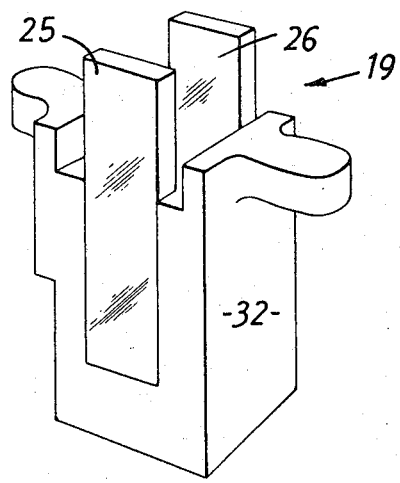
FIG. 3 is a perspective view of one form of cell forming part of the appratus.

Referring now to FIG. 2, a first light source is defined by a highly stable helium-neon laser 10, a pair of reflectors 11, 12 in the form of mirrors or prisms and a lens 13. An alternative light source is defined by a high pressure Xenon arc 14 in conjunction with a monochromator 15, a further pair of reflectors 16, 17 and the lens 13. Either light source is capable of supplying a beam of monochromatic and parallel light, which, in accordance with the invention, need not, and in the specific apparatus described is not, polarised. If the arc source is used, it is energised by a highly stabilised D.C. power supply. In the observation of transient optical effects, the light source should be ripple-free. The helium-neon laser source is, however, preferred.

A beam of light 18 from either light source enters a cell 19 which contains the sample to be tested, through an aperture in a shutter 20 and, after leaving the cell 19 is passed through a second aperture in a further shutter 21, into a photo-multiplier 22, the output from which is fed into an oscilloscope 23; the display of the oscilloscope 23 is recorded by means of a camera 24.

Opposite end walls 25, 26 of the cell 19 which are transverse (preferably perpendicular) to the beam 18 have electrodes incorporated therein, whereby an electric field, parallel to the beam 18, may be applied to the sample in the cell 19.

The source of the said field consists of a conventional 10V rectangular pulse generator 27, two relays 28, 29, a 12V battery 30 and a high voltage D.C. supply 31, connected as shown.

A simple form of cell 19, comprising a PTFE body 32 and conducting windows defining the opposite end walls 25, 26 is shown in FIG. 2. These windows are of quartz, coated on their inner faces with transparent conducting electrodes of stannous oxide. This coating is applied by thoroughly cleaning the quartz windows, heating them to a temperature of 500°C and then spraying them with an aqueous solution of stannic chloride. To achieve an even, well adhered film, spraying is done by means of an atomiser kept 10 cm from the quartz and the spray pressure held constant at 6 kg cm$^{-2}$. A burst of 5 seconds was found to give high resistance but extremely transparent films of 95 percent transmission at 500 nm wavelength. By masking the centre of the quartz with colloidal graphite, a thicker coating was applied around the edges for better electrical contact. The PTFE body provides both high solvent resistance and efficient isolation of the electrodes. The windows are preferably glued to the body, using alabaster since this is impervious to most solvents and does not cause such strain birefringence in the windows upon drying as epoxy resins tend to do.

Figure 4:
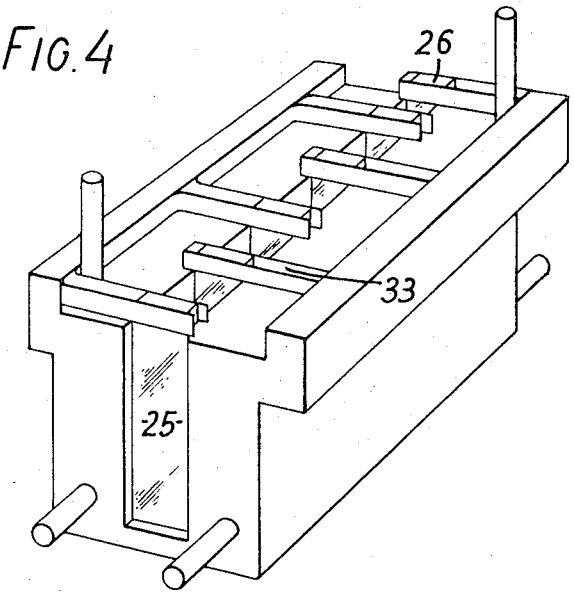
FIG. 4 is a perspective view of a second form of cell forming part of the apparatus.
Figure 5:
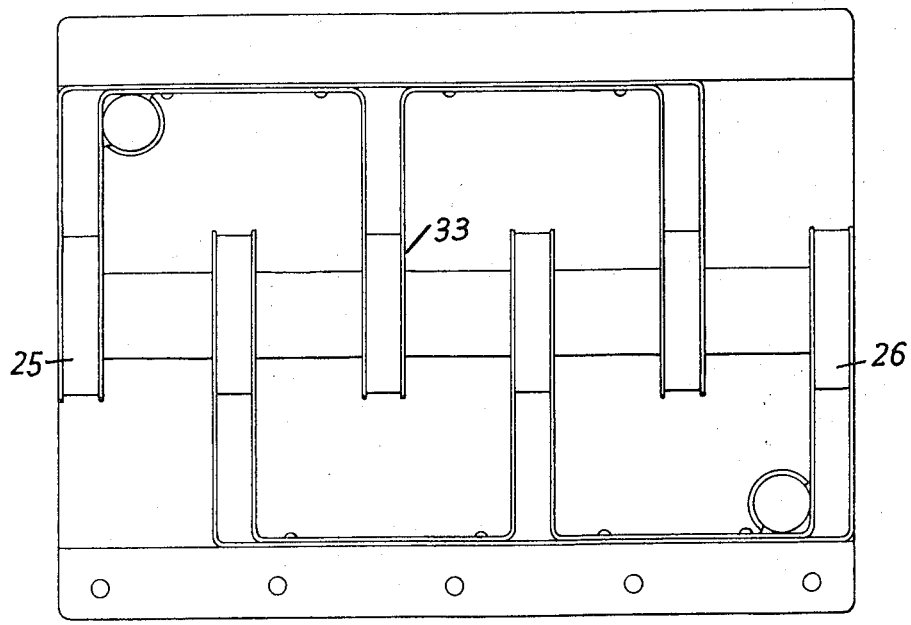
FIG. 5 is a plan view of the cell of FIG. 4.

The preferred form of cell 19, however, is the multiple cell shown in FIGS. 4 and 5, the purpose of which is to increase the sensitivity of the cell by increasing its length, whilst reducing or eliminating the decrease in the field which such longitudinal extension would otherwise cause. This multiple cell is essentially a series array of single or individual cells, except that the internal windows, such as 33, are coated on both sides. In the preferred form, each individual cell or compartment of the sample cell holds up to 1 millilitre of liquid under test. A potential difference is applied across each successive pair of internal windows or plates, thus increasing the cell length whilst maintaining the field strength; with a view to keeping capacitative effects to a minimum, the electrode area must be kept as small as possible, since high cell capacitance distorts the applied pulse.

It will be noted that the internal windows or walls, such as 33 of the individual cells are relatively staggered laterally with respect to the axis of the said beam in such a way that the portions of the sample in adjacent such individual cells communicate along a meandering path.

Reverting to FIG. 2 (and particularly to the components 27-31 of the field source), in operation, voltages of up to 5 kV have in practice been applied to the cell 19. A pulse of variable width (1 to 200 milliseconds) from the pulse generator 27 is caused to close the relay 28 which operates the second relay 29. Thereby the circuit from the high voltage D.C. supply to the cell electrodes is completed. The purpose of the two relays is to isolate the pulse generator 27 from the D.C. supply 31, lest the back EMF induced by switching the latter causes a succession of pulses to be triggered from the pulse generator 27.

One reason for applying the field in pulses rather than continuously is that the rate of dichroic changes can be determined and particle sizes evaluated therefrom.

Apparatus embodying the invention may also be used for the "on-line" testing of materials or substances, and for this purpose the cell containing the sample may be a flow cell, viz. one through which the material or substance concerned is passed continuously or intermittently. The signal representing longitudinal dichroism received by the detector may, if desired, be used to control a parameter of a manufacturing plant or for other quality control purposes.

The example chosen to illustrate the invention is one involving the application of an electric field. The same principles, however, apply in the case of the other forms of force field hereinbefore mentioned, using appropriate transducers (e.g. an ultrasonic transducer in the case of an accoustic field or a magnetic transducer in the case of a magnetic field) to apply the required field to the cell, or (as the case may be) suitable equipment for applying a hydrodynamic field, with appropriate apertures for the beam of light, the purpose of the field in every case being to orientate the molecules of the sample.

The invention is particularly applicable to the testing of macromolecular materials or substances, the samples of the latter preferably being introduced into the cell in solution or suspension in an appropriate solvent or other liquid medium. Examples of such materials are amylose triiodide, polybenzyl glutamate and DNA.

We claim:

1. Apparatus for ascertaining the longitudinal linear dichroism of a material when subjected to an electric field, comprising in combination:
   a cell for receiving a sample of the material, said cell including spaced, parallel windows having transparent electrically conductive coatings on the opposed surfaces thereof;
   means for selectively applying an electrical field between said conductive coating to pass through material in the cell along a path normal to said windows;
   light source means for projecting monochromatic, parallel light through said cell and material therein along said path through and normal to one of said windows and emerging through the other window; and
   photo-detector means positioned to receive light emerging through said other window for producing an output in response to changes in the intensity of light so received.

2. Apparatus according to claim 1 wherein said light source means projects non-polarized light.

3. Apparatus according to claim 1, wherein said cell is defined by a series array of a plurality of individual cells aligned for the transmission therethrough of a said beam, each said individual cell having electrodes each of which is defined by a coating of a wall of the individual cell in a plane perpendicular to the said beam, said coating being transparent to said light and electrically conductive, terminal walls of said cell having a said coating applied to their inside surfaces and intermediate walls of said cell defining walls of said individual cells having a said coating applied to both opposite surfaces thereof, said individual cells being arranged to permit communication between portions of the sample in adjacent said individual cells.

4. Apparatus according to claim 3, wherein said walls of said individual cells in a plane perpendicular to said beam are relatively staggered laterally with respect to the axis of said beam in such a way that said communication between portions of the sample in adjacent said individual cells occurs along a meandering path.

5. Apparatus according to claim 3, wherein said walls are made of quartz and said coating comprises stannous oxide.

6. Apparatus according to claim 3, wherein said cell for accommodating a said sample is a flow cell.

7. Apparatus according to claim 1, including means responsive to a signal representing longitudinal dichroism received by said detector and adpated to control a parameter of a manufacturing plant.

* * * * *